United States Patent [19]

Thomas

[11] Patent Number: 4,500,689

[45] Date of Patent: Feb. 19, 1985

[54] LOW COST POLYESTER MODIFIED PHENOLIC RESIN CONTAINING A COMBINATION OF LONG AND SHORT CHAIN ALKYLPHENOLS

[75] Inventor: Charles H. Thomas, Monroeville, Pa.

[73] Assignee: Westinghouse Electric Corp., Pittsburgh, Pa.

[21] Appl. No.: 567,449

[22] Filed: Dec. 30, 1983

[51] Int. Cl.³ ............................................. C08L 67/08
[52] U.S. Cl. ...................................... 525/442; 336/94; 428/458; 428/460; 524/539; 525/443
[58] Field of Search ................ 525/442, 443; 528/155; 524/539; 428/458

[56] References Cited

U.S. PATENT DOCUMENTS

| | | | |
|---|---|---|---|
| 3,061,579 | 10/1962 | Mecum et al. | 260/44 |
| 3,216,884 | 11/1965 | O'Donnell | 161/232 |
| 3,538,186 | 11/1970 | Payette | 260/839 |
| 4,261,873 | 4/1981 | Laganis et al. | 260/29.2 E |

Primary Examiner—Theodore E. Pertilla
Attorney, Agent, or Firm—D. P. Cillo

[57] ABSTRACT

A low cost resinous insulating solution is made by blending a polyester resin with a solution of a reaction product admixture containing long chain alkyl phenol, short chain alkyl phenol, crosslinking agent, aldehyde and alkali catalyst.

8 Claims, No Drawings

LOW COST POLYESTER MODIFIED PHENOLIC RESIN CONTAINING A COMBINATION OF LONG AND SHORT CHAIN ALKYLPHENOLS

BACKGROUND OF THE INVENTION

Phenolic resins are well known for their heat resistance. They tend to produce somewhat brittle, and nonresilient insulation coatings, however. Oil modified phenolics, while adding some flexibility, provide a structure which is difficult to control. Recognizing these problems, Mecum et al., in U.S. Pat. No. 3,061,579, provided a phenolic composition which included polyester linkages. The polyester component not only reduced the brittleness of the phenolic, but also added desirable properties, such as elasticity, structural strength, and adhesiveness. They provided much improved compositions compared to oil modified phenolics. In Mecum et al., the phenolic consisted of simple phenol reacted in excess with formaldehyde and cresol in the presence of sulfuric acid, to provide phenol Novolacs. The phenolic was then alcoholized to form an intermediate which was then esterified with dicarboxylic acid, such as azelaic acid, and dihydric alcohol, such as butane diol. The use of simple phenols alone, because of their trifunctional nature, produces very thick coating compositions that are difficult to apply for insulating motor coils and the like.

O'Donnell, in U.S. Pat. No. 3,216,884, used another approach to modifying phenolic resins. There, a phenolic-polyester impregnating emulsion was provided, comprising droplets of a solution of a phenol-aldehyde resin dissolved in a diluent, such as, at least one of water, alcohol, or ketone, suspended in an undissolved, unsaturated polyester resin. The weight ratio of phenolic:-polyester was from about 1:1 to 20. The phenolic component can contain phenol, alkyl phenols where alkyl contains from 1 to 18 carbons, and their mixtures, i.e., substantially any phenol. Acid catalysts are most commonly employed, to provide phenolic Novolacs. This emulsion is used to impregnate cellulosic paper in the laminating art, where the diluent serves to initially swell the cellulosic fibers to increase their surface area, allowing uniform deposition of the diluent-insoluble polyester. Such emulsions, however, would be limited as insulating varnishes for motor coils and the like, because of their emulsion properties and their water base.

Payette, in U.S. Pat. No. 3,538,186, relating to magnet wire insulation, utilized a polyester base with 1 to 6 weight percent of a phenol-furfuraldehyde component to provide excellent flexibility, heat shock resistance, thermal life, and abrasion resistance properties. Here, the phenolic component could be any phenol, including substituted phenols and cresols, where reaction with furfuraldehyde proceeds in the presence of a basic catalyst, such as triethanolamine and a solvent such as cresylic acid. Laganis et al., in U.S. Pat. No. 4,261,873, relates to water soluble, oil free, fatty acid free polyester insulating varnishes, having high temperature properties and good hot bond strengths. There, 27 to 57 weight percent of the composition consisted of a phenolic resin reaction product of formaldehyde and a mixture of alkyl phenol, where alkyl contains from 1 to 12 carbons, polyhydroxyphenol, such as resorcinol, $C_6H_4(OH)_2$, and hydroxy benzoic acid.

While all of these resin systems solve various problems, there is still a need for a motor coil insulating varnish in a petroleum type solvent having low cost, ease of manufacture and application, and good electrical as well as good thermal and cure properties.

SUMMARY OF THE INVENTION

The above problems have been solved and the above needs met by providing a low cost insulating resin which has a good gel time, hardness, and adhesiveness, and outstanding electrical properties, hot bond strength and toughness. The resinous insulating solution of this invention contains a blend of polyester resin with a phenolic reaction product admixture combination of: (1) long chain alkyl phenol, where alkyl contains from 8 to 10 carbon atoms, preferably 9 carbon atoms, combined with short chain alkyl phenol, where alkyl contains from 3 to 6 carbon atoms, preferably 4 carbon atoms; (2) crosslinking agent, selected from at least one of cresylic acid or phenol; and (3) aldehyde. The phenolic resin ingredients are first reacted to reflux in the presence of an alkali catalyst, preferably an alkali hydroxide, after which the reaction product is cooled, acidified and further reacted before organic solvent is added. The phenolic reaction product is cold blended with a saturated polyester which constitutes from about 25 wt.% to about 75 wt.% based on the solids of the insulating solutions.

The phenolic reaction product admixture must have a combination of both long and short chain alkyl phenols, where the combination contains from about 20 wt.% to about 75 wt.% of long chain alkyl phenol. Malenized oils can be reacted with the phenolic reaction product. Also, melamine-formaldehyde or urea-formaldehyde resins may also be blended with the polyester-phenolic resinous solution. The resinous solution can be coated and cured on insulated articles, such as motors or transformers.

DESCRIPTION OF THE PREFERRED EMBODIMENTS

The low cost, polyester modified phenolic varnish solutions of this invention comprise a blend of saturated polyester resin with a solution of a phenolic reaction product admixture combination of: (1) long chain alkyl phenol, where alkyl contains from 8 to 10 carbon atoms, preferably nonylphenol, with alkyl in the para position, combined with short chain alkyl phenol, where alkyl contains from 3 to 6 carbon atoms, preferably tertiarybutylphenol, with alkyl in the para position; (2) trifunctional crosslinking agent, preferably selected from at least one of cresylic acid containing a high percentage of meta cresol, or simple phenol, i.e., $C_6H_5OH$; (3) aldehyde solution, preferably aqueous formaldehyde; and (4) alkali catalyst.

The phenolic resin ingredients are first reacted to reflux at from about 95° C. to 100° C. in the presence of an alkali catalyst, preferably sodium hydroxide, for from about 20 minutes to about 40 minutes. Water is then added to the reactants to cool the reaction to from about 60° C. to about 75° C., after which acid, preferably sulfuric acid is added, with stirring, to adjust the pH to the acidic side, i.e., a pH of from about 4 to about 6. The stirrer is stopped and any water from the aldehyde plus the cooling water now separates from the resin to form a top layer which is drawn off. The reaction product admixture is then vacuum dehydrated, to remove the remaining water, at about 20 inches of mercury, until a temperature of from about 105° C. to about 120° C. is reached. The vacuum is then broken and the reaction is continued at from about 120° C. to about 135° C. at atmospheric pressure, to provide a P viscosity on the Gardner Holt scale at 60% solids. Then organic solvent such as xylol, toluol, or mineral spirits are added to terminate the reaction. The preferred solvent is xylol.

In some instances a fatty acid oil, such as malenized linseed oil, or tung oil, can be added as a flexibilizer, and/or solid, reactive, phenolic resin particles can be added to further reduce cost. The phenolic reaction product can comprise from about 25 solids weight percent to about 75 solids weight percent of the varnish, i.e., about 25 solids weight percent to about 75 solids weight percent polyester resin, with a preferred ratio of 50 solids weight percent phenolic reaction product and 50 solids weight percent polyester resin. Over about 75 solids weight percent polyester solids and the cured resin becomes soft and assumes the characteristics of an all polyester resin. Also, melamine-formaldehyde resin or urea-formaldehyde resin can be added to the varnish solution, up to about 6 weight percent based on phenolic plus polyester solids. This addition can improve the hardness and the rate of cure of the resin on the coated article.

The phenolic reaction product admixture must have a combination of both long and short chain alkyl phenols, where the combination contains from about 20 wt.% to about 75 wt.% long chain alkyl phenol, with the rest being short chain alkyl phenol. The use of over about 75 wt.% long chain alkyl phenols, where the alkyl group contains 8 to 10 carbon atoms, starts to produce insoluble precipitate, reducing the yield. The use of a system containing 100 wt.% long chain alkyl phenols also emulsifies the resin, requiring a long, expensive, dehydration step, and producing a weak, cellular resin upon cure, having poor properties. The use of the blend of the prescribed combination of alkyl phenols provides low viscosity varnishes which have no precipitate, and which do not emulsify. The use of over 80 wt.% short chain alkyl phenol in the alkyl phenol combination, can cause a drop in cake hardness and produces a more expensive varnish which may require additional oil flexibilizers.

The blending of long chain alkyl phenols of the 8 to 10 carbon atom variety with shorter chain alkyl phenols of the 3 to 6 carbon atom variety provides a low cost varnish, and overcomes the weak cellular properties of varnishes using only long chain alkyl phenols. In the phenolic reaction product admixture, the combination of long and short chain alkyl phenols should constitute from about 60 wt.% to about 75 wt.%, the crosslinking agent should constitute from about 16 wt.% to about 26 wt.%, and aldehyde solids should constitute from about 6 wt.% to about 12 wt.% of the admixture, all based on solids.

Useful saturated polyester (alkyd) resins include any non-aqueous, solvent based polyester, preferably containing an aromatic, dicarboxylic acid, such as phthalic anhydride or isophthalic acid or anhydride, and a multifunctional polyol, such as glycerine, ethylene glycol, propylene glycol, tris(2 hydroxyethyl)isocyanurate or trimethylol propane. Usually this type of polyester is modified with an oil such as linseed oil and a chain terminator such as benzoic acid. Such saturated polyesters are well known in the art.

The resulting varnish is a true solution rather than an emulsion, bead polymerized material, or molding compound, and is useful as an insulation for motors and transformers as a protective coating. Cure of the varnish solution is carried out by condensation, without protective colloid, with crosslinking of the phenolic reaction product by a trifunctional material through the phenol aldehyde linkages.

EXAMPLE 1

A charge was made into a 3 neck reaction flask equipped with a stirrer, condenser, thermometer and inert gas tube. The charge consisted of:

| | | |
|---|---|---|
| nonylphenol | 253 | grams |
| paratertiarybutylphenol | 253 | grams |
| cresylic acid | 171 | grams |
| formaldehyde (37% aqueous) | 209 | grams |
| sodium hydroxide | 2.8 | grams |

This provided a weight ratio of long chain alkyl phenol (alkyl=9, i.e., nonylphenol):short chain alkyl phenol (alkyl=4, i.e., paratertiarybutylphenol) of 1:1, i.e., 50 wt.% of the alkyl phenol combination was long chain alkyl phenol. The charge ingredients were heated to reflux at about 99° C. and then refluxed for 30 minutes. About 200 ml. of water was then added to cool the reaction product to about 65° C. Then 2.7 grams of concentrated sulfuric acid was added to adjust the pH to about 4.5 to 4.8. The stirrer was then stopped. No precipitate or emulsion was formed. The water from the aqueous formaldehyde plus the water that was used for cooling separated from the resin, forming a top layer which was drawn off. The stirrer was again started, the heat turned on and the reaction product was vacuum dehydrated for about 45 minutes, at 20 inches of mercury, until a temperature of 115° C. was reached. The vacuum was then broken and the reaction continued at from about 125° C. to 130° C., to provide a P viscosity on the Gardner Holt scale at 60% solids in xylol. Then, 696 grams of xylol solvent was added to terminate the reaction.

EXAMPLE 2

A charge was made using the same ingredients as in EXAMPLE 1, but using an alkyl phenol combination containing 75 wt.% of long chain alkyl phenol (nonyl phenol) and 25 wt.% of short chain alkylphenol (paratertiarybutylphenol). The charge was refluxed, cooled with water, acidified with sulfuric acid and the resin separated as in EXAMPLE 1. No emulsion was formed when the resin and water separated. With this combination a very small amount of precipitate did form, which later proved to downgrade somewhat the physical properties of the resin. The reaction product was vacuum dehydrated, further reacted without vacuum, and diluted with xylol as in EXAMPLE 1.

EXAMPLE 3

A charge was made using the same ingredients as in EXAMPLE 1, but using an alkyl phenol combination containing 25 wt.% of long chain alkyl phenol (nonyl phenol) and 75 wt.% of short chain alkylphenol (paratertiarybutylphenol). The charge was refluxed, cooled with water, acidified with sulfuric acid and the resin separated as in EXAMPLE 1. No emulsion was formed when the resin and water separated. The reaction product was vacuum dehydrated, further reacted without vacuum, and diluted with xylol as in EXAMPLE 1. No precipitate was formed. However, use of larger amounts of the more expensive paratertiarybutylphenol would add to final varnish cost.

EXAMPLE 4

A charge was made into a 3 neck reaction flask equipped with a stirrer condenser, thermometer and inert gas tube. The charge consisted of:

| nonylphenol | 436 grams |
|---|---|
| paratertiarybutylphenol | 436 grams |
| phenol | 348 grams |
| formaldehyde (37% aqueous) | 406 grams |
| sodium hydroxide | 4.9 grams |

This charge used a simple phenol crosslinker rather than cresylic acid. The charge was refluxed, cooled with water, acidified with sulfuric acid and the resin separated as in EXAMPLE 1. No precipitate or emulsion was formed. The reaction product was vacuum dehydrated, further reacted without vacuum, as in EXAMPLE 1, and then diluted with 2367 grams of xylol.

EXAMPLE 5

A charge was made into a 3 neck reaction flask equipped with a stirrer, condenser, thermometer and inert gas tube. The charge consisted of:

| nonylphenol | 453 grams |
|---|---|
| paratertiarybutylphenol | 453 grams |
| cresylic acid | 305 grams |
| formaldehyde (37% aqueous) | 375 grams |
| sodium hydroxide | 5 grams |

The charge was refluxed, cooled with water, acidified with sulfuric acid and the resin separated as in EXAMPLE 1. No precipitate or emulsion was formed. The reaction product was vacuum dehydrated at 20 inches of mercury until a temperature of about 82° C. was reached; then 464 grams of malenized linseed oil was added and the vacuum dehydration was continued until 115° C. was reached. The vacuum was broken and the reaction continued at from about 125° C. to 130° C., to provide a P viscosity on the Gardner Holt scale at 60% solids in xylol. Then, 2367 grams of xylol solvent was added to terminate the reaction.

COMPARATIVE EXAMPLE 6

A charge was made into a 3 neck reaction flask equipped with a stirrer, condenser, thermometer and inert gas tube. The charge consisted of:

| nonylphenol | 905 grams |
|---|---|
| cresylic acid | 195 grams |
| formaldehyde | 279 grams |
| sodium hydroxide | 3 grams |

This provides a charge with no short chain alkylphenol (paratertiarybutylphenol). The charged ingredients were heated to reflux at about 99° C. and refluxed for 30 minutes. About 300 ml. of water was then added to cool the reaction product to about 65° C. Then 4.8 grams of concentrated sulfuric acid was added to adjust the pH to about 4.5 to 4.8. The stirrer was then stopped. The water from the aqueous formaldehyde and the water that was used for cooling, did not separate from the resin, since an emulsion had formed. The reaction product was vacuum dehydrated for about 120 minutes at 20 inches of mercury until a temperature of 115° C. was reached. The vacuum was then broken and the reaction continued at from about 125° C. to 130° C., to provide a P viscosity on the Gardner Holt scale at 60% solids in xylol. Then, 1200 grams of xylol solvent was added to terminate the reaction. During the reaction, a large amount of precipitate was in evidence, and had to be filtered from the solution. As can be seen, the use of all long chain alkyl phenol caused an emulsion, requiring a lengthy vacuum dehydration step, and resulted in precipitate formation which dramatically downgraded the physical properties of the resin.

EXAMPLE 7

In this example, solutions of the phenolic reaction products of EXAMPLES 1 through 6 were mixed with polyester resin solution in various proportions, ranging from 30 wt.% polyester to 70 wt.% polyester, to provide varnish samples. The varnish samples were then tested for gel time, cake hardness and bond strength. The polyester consisted of the reaction product admixture of: 2816 grams of isophthalic acid, 1400 grams of glycerine polyfunctional alcohol, 544 grams of benzoic acid chain terminator, and 4160 grams of linseed oil, all dissolved after reaction in 5900 grams of xylene solvent. This saturated polyester was cold blended with the various phenolic reaction products.

The varnishes were placed in 3/4"×2" diameter aluminum dishes to record 135° C. forced air oven gel times. Cake hardness tests under ASTM D115 were run to record the degree of cure crosslinking, the tests recording durometer measurements of skin/inside hardness, of 3/4"×2" diameter cakes after 6 hours cure at 135° C. For the oil test, the cured cakes were cut in half, put in 110° C. transformer oil for 24 hours, removed and cooled, wiped clean, and tested again for durometer hardness. The higher both figures are in the durometer test, the better cured the sample, and the more useful the varnish as an insulation material. Bond strength at 25° C. and 150° C. were also recorded using the Helical Bond Test. The higher these values, the better the sample is as an insulation varnish. The results of the tests are recorded in Table 1:

TABLE 1

| | Gel Time | Skin/Inside Cake Hardness | | Bond Strength | |
|---|---|---|---|---|---|
| | 135° C. | No Oil | In Oil | 25° C. | 150° C. |
| EXAMPLE 1 Wt. % ratio long chain phenol: short chain phenol = 50:50, + CA | | | | | |
| 70 parts phenolic + 30 parts polyester | 65 min. | 70/45 | 70/65 | 44 lbs. | 6 lbs. |
| 50 parts phenolic + 50 parts polyester | 55 min. | 55/47 | 85/75 | 35 lbs. | 3 lbs. |
| 30 parts phenolic + 70 parts polyester | 60 min. | 53/45 | 42/40 | 35 lbs. | 3 lbs. |
| EXAMPLE 2 Wt. % ratio long chain phenol: short chain phenol = 75:25, + CA | | | | | |
| 70 parts phenolic + 30 parts polyester | 75 min. | 55/50 | 60/50 | 35 lbs. | 4 lbs. |
| 50 parts phenolic + 50 parts polyester | 80 min. | 45/30 | 55/40 | 30 lbs. | 3 lbs. |
| 30 parts phenolic + 70 parts polyester | 80 min. | 35/25 | 40/35 | 30 lbs. | 2 lbs. |
| EXAMPLE 3 Wt. % ratio long chain phenol: short chain phenol = 25:75, + CA | | | | | |
| 70 parts phenolic + 30 parts polyester | 65 min. | 60/50 | 65/50 | 40 lbs. | 4 lbs. |
| 50 parts phenolic + 50 parts polyester | 60 min. | 45/40 | 60/50 | 35 lbs. | 3 lbs. |
| 30 parts phenolic + 70 parts polyester | 60 min. | 45/40 | 50/40 | 30 lbs. | 3 lbs. |

TABLE 1-continued

| | Gel Time 135° C. | Skin/Inside Cake Hardness No Oil | Skin/Inside Cake Hardness In Oil | Bond Strength 25° C. | Bond Strength 150° C. |
|---|---|---|---|---|---|
| EXAMPLE 4 Wt. % ratio long chain phenol: short chain phenol = 50:50, + PH | | | | | |
| 70 parts phenolic + 30 parts polyester | 85 min. | 85/75 | 85/75 | 62 lbs. | 5 lbs. |
| 50 parts phenolic + 50 parts polyester | 75 min. | 59/56 | 85/75 | 64 lbs. | 3 lbs. |
| 30 parts phenolic + 70 parts polyester | 75 min. | 82/70 | 60/55 | 42 lbs. | 1 lb. |
| EXAMPLE 5 Wt. % ratio long chain phenol including oil: short chain phenol = 50:50, + CA | | | | | |
| 70 parts phenolic + 30 parts polyester | 60 min. | 45/40 | 80/70 | 35 lbs. | 5 lbs. |
| 50 parts phenolic + 50 parts polyester | 65 min. | 37/33 | 75/62 | 30 lbs. | 3 lbs. |
| 30 parts phenolic + 70 parts polyester | 50 min. | 45/40 | 75/70 | 30 lbs. | 3 lbs. |
| *EXAMPLE 6 Wt. % ratio long chain phenol: short chain phenol = 100:0, + CA | | | | | |
| 70 parts phenolic + 30 parts polyester | 75 min. | 30/28 | 40/20 | 30 lbs. | 1 lb. |
| 50 parts phenolic + 50 parts polyester | 80 min. | 30/28 | 40/19 | 30 lbs. | 1 lb. |
| 30 parts phenolic + 70 parts polyester | 80 min. | 32/22 | 40/22 | 30 lbs. | 1 lb. |

*Comparative Example
CA = cresylic acid
PH = phenol

As can be seen, comparative Example 6 had poorer bond strength values, and cake hardness values than the other Examples, particularly Examples 1 and 4, due primarily to the use of only long chain alkyl phenol in Example 6, which provided a weak, cellular cured structure. In Example 2, which uses about the maximum amount of long chain alkyl phenol, the properties were not as good as in Example 1, where a 50 wt.%:50 wt.% ratio was used. Example 2, however, at 75 wt.% long chain alkyl phenol, does provide much better hot bond strengths and generally better cake hardness values than Comparative Example 6, which uses 100 wt.% long chain alkyl phenol. The properties of Example 3, which is near the lower limit of long chain alkyl phenol, at 25 wt.%, are outstanding in terms of gel time, cake hardness and hot bond strength, indicating that a further drop of long chain alkyl phenol, to about 20 wt.% of the combination of long and short chain alkyl phenols, would be acceptable. As can be seen, the best properties are provided with a 50 wt.%:50 wt.% ratio of long chain alkyl phenol:short chain alkyl phenol.

Thus, use of a combination mixture of short chain alkyl phenol and long chain alkyl phenol, with about 20 wt.% to about 75 wt.% of long chain alkyl phenol provides a low cost varnish, and dramatic improvement in hardness and bond strength over the use of long chain alkyl phenols alone in the phenolic reaction product. Additional improvement in gel time, to about 45 minutes in the 50% polyester solution of Example 1, is achieved by about 4 wt.% to about 6 wt.% addition of melamineformaldehyde resin.

I claim:

1. A resinous insulating solution comprising:
   (A) polyester resin solution, and
   (B) a solution of a reaction product of a combination of:
      (1) long chain alkyl phenol, where alkyl contains from 8 to 10 carbon atoms, combined with short chain alkyl phenol, where alkyl contains from 3 to 6 carbon atoms, where the combination contains from about 20 wt.% to about 75 wt.% of long chain alkyl phenol,
      (2) crosslinking agent selected from the group consisting of cresylic acid, phenol, and mixtures thereof,
      (3) aldehyde, and
      (4) alkali catalyst, where polyester resin solids comprise from about 25 solids weight percent to about 75 solids weight percent of the insulating solution.

2. The resinous solution of claim 1, where alkyl, in the long chain alkyl phenol, contains 9 carbon atoms, alkyl, in the short chain alkyl phenol, contains 4 carbon atoms, and the alkali catalyst is an alkali hydroxide.

3. A resinous, insulating solution comprising:
   (A) saturated polyester resin solution, and
   (B) a solution of a reaction product of a combination of:
      (1) long chain alkyl phenol, where alkyl contains from 8 to 10 carbon atoms, combined with short chain alkyl phenol, where alkyl contains from 3 to 6 carbon atoms, where the combination contains from about 20 wt.% to about 75 wt.% of long chain alkyl phenol,
      (2) crosslinking agent selected from the group consisting of cresylic acid, phenol, and mixtures thereof,
      (3) aldehyde, and
      (4) alkali hydroxide catalyst, where components (1), (2), (3), and (4) of the reaction product are reacted, cooled, and acidified, after which organic solvent is added, and where polyester resin solids comprise from about 25 solids weight percent to about 75 solids weight percent of the insulating solution.

4. The resinous solution of claim 3, where alkyl, in the long chain alkyl phenol, contains 9 carbon atoms, and alkyl, in the short chain alkyl phenol, contains 4 carbon atoms.

5. The resinous solution of claim 3, where the crosslinking agent is selected from the group consisting of cresylic acid having a high percentage of meta cresol, phenol, and mixtures thereof, the aldehyde is formaldehyde, the alkali catalyst is sodium hydroxide, and the reaction product is acidified with sulfuric acid.

6. The resinous solution of claim 3, where the aldehyde is aqueous formaldehyde, the reaction product is cooled with water, and where, after the reaction product is acidified, water is removed.

7. The resinous solution of claim 3, mixed with up to about 6 weight percent, based on the solids of the resinous solution, with a resin selected from the group consisting of melamine-formaldehyde resin and ureaformaldehyde resin.

8. The resinous solution of claim 3, coated and cured on an article to provide an electrical insulation layer.

* * * * *